US006964630B1

(12) United States Patent
Magyari

(10) Patent No.: US 6,964,630 B1
(45) Date of Patent: Nov. 15, 2005

(54) INFINITELY VARIABLE TRANSMISSION

(76) Inventor: Douglas Magyari, 4245 Buckingham Rd., Royal Oak, MI (US) 48073

( * ) Notice: Subject to any disclaimer, the term of this patent is extended or adjusted under 35 U.S.C. 154(b) by 0 days.

(21) Appl. No.: 10/129,215

(22) PCT Filed: Oct. 20, 2000

(86) PCT No.: PCT/US00/41398

§ 371 (c)(1),
(2), (4) Date: May 23, 2002

(87) PCT Pub. No.: WO01/33106

PCT Pub. Date: May 10, 2001

Related U.S. Application Data

(63) Continuation of application No. 09/431,512, filed on Nov. 1, 1999, now Pat. No. 6,338,692.

(51) Int. Cl.[7] .......................... F16H 15/44; F16H 55/32

(52) U.S. Cl. ............................................ 476/55; 476/72

(58) Field of Search ............................... 476/55, 72, 73

(56) References Cited

U.S. PATENT DOCUMENTS

| | | | |
|---|---|---|---|
| 359,076 | A | 3/1887 | Hoffman |
| 825,759 | A | 7/1906 | Ruck |
| 861,082 | A | 7/1907 | Bowne et al. |
| 889,333 | A | 6/1908 | Reenstierna |
| 920,192 | A | 5/1909 | Seymour |
| 958,694 | A | 5/1910 | Cox |
| 1,416,567 | A | 5/1922 | McNeel |
| 1,713,027 | A | 5/1929 | Cleaves |
| 2,283,293 | A | 5/1942 | Steiert |
| 2,424,873 | A | 7/1947 | Abbrecht |
| 2,526,435 | A | 10/1950 | Teigman |
| 2,690,661 | A | 10/1954 | Briggs |
| 2,941,410 | A | 6/1960 | Ota |
| 2,970,494 | A | 2/1961 | Lynch |
| 3,143,895 | A | 8/1964 | Robie |
| 3,333,479 | A | 8/1967 | Shields |
| 3,617,426 | A | 11/1971 | Grundman |
| 3,654,777 | A | 4/1972 | Grundman |
| 3,687,251 | A | 8/1972 | Hoerner |
| 3,718,009 | A | 2/1973 | Perina |
| 3,817,494 | A | 6/1974 | Eckerdt |
| 4,028,949 | A | 6/1977 | Hagen |
| 4,370,895 | A | 2/1983 | Wright |
| 4,616,519 | A | 10/1986 | Yoshida |
| 5,417,621 | A | 5/1995 | Tibbles |
| 5,514,047 | A | 5/1996 | Tibbles et al. |
| 5,641,320 | A | 6/1997 | Ketcham |
| 5,681,235 | A | 10/1997 | Ketcham |
| 6,338,692 | B1 | 1/2002 | Magyari |

FOREIGN PATENT DOCUMENTS

| | | |
|---|---|---|
| DE | 88107 | 4/1895 |
| DE | 28 05 699 | 9/1979 |
| DE | 33 19 178 A1 | 2/1985 |
| FR | 850348 | 12/1939 |
| FR | 2 416 401 | 8/1979 |
| WO | WO 93/02302 | 2/1993 |

*Primary Examiner*—William C Joyce
(74) *Attorney, Agent, or Firm*—Brooks Kushman P.C.

(57) ABSTRACT

An infinitely variable transmission comprising a pair of rotary, generally conical, torque-transmitting members (20, 22), each being mounted for rotation on its geometric axis (82, 84), the angularity of the axes, one with respect to the other, being variable, the outer surfaces of each member having torque-transmitting needles (86, 88) extending outwardly from the generally conical surface, the needles of member meshing with the needles of its companion member, the needles being capable of flexing whereby torque may be transmitted through the rotary member without frictional sliding motion at the area of meshing engagement of the needles, the angularity of one member with respect to the other permitting a wide torque-transmitting ration range.

1 Claim, 7 Drawing Sheets

Fig. 6
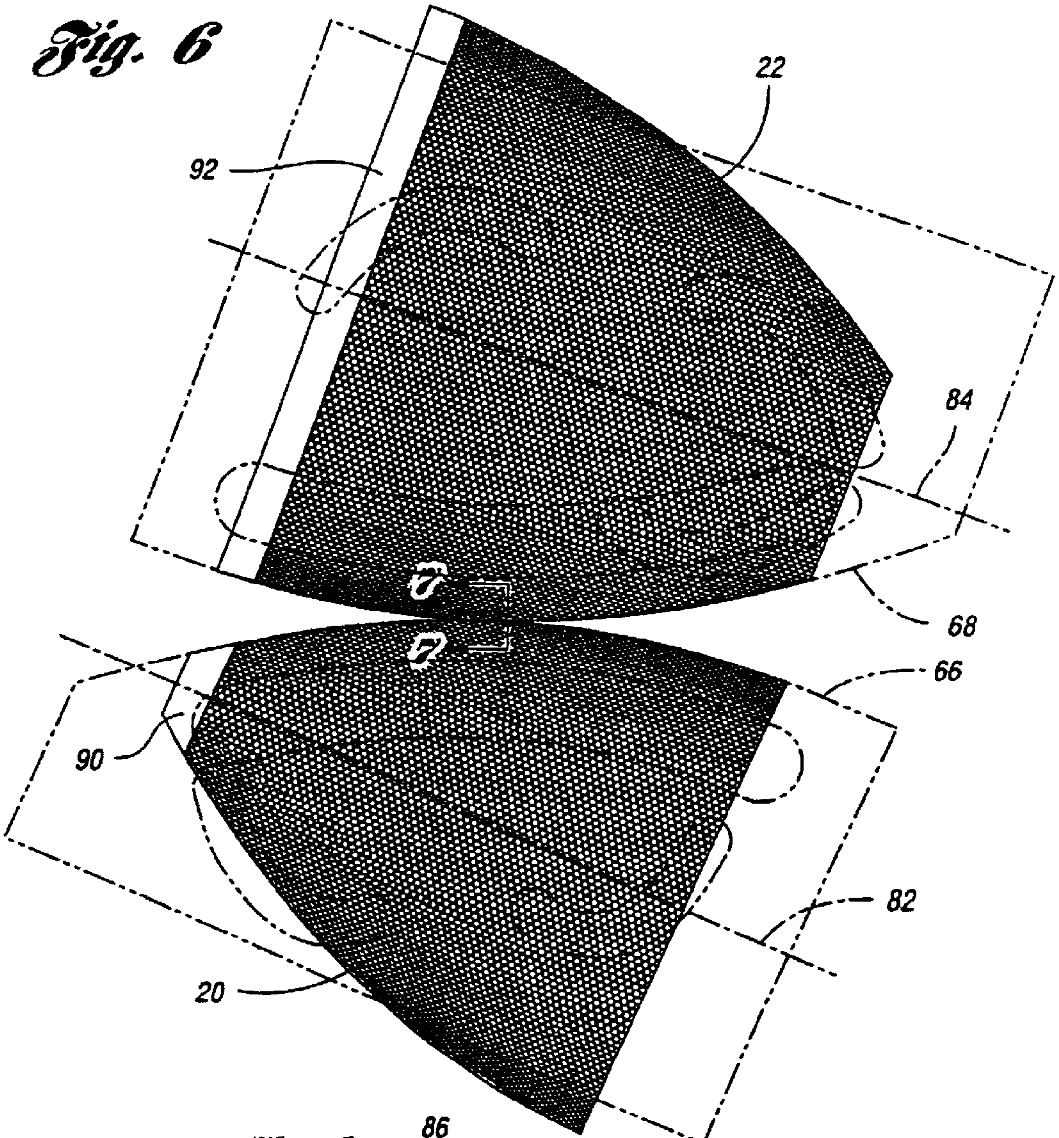
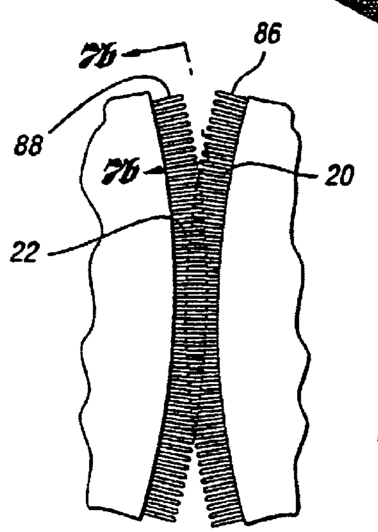
Fig. 7

INFINITELY VARIABLE TRANSMISSION

CROSS-REFERENCE TO RELATED APPLICATION

This application is the U.S. national phase of PCT application number PCT/US00/41398, filed Oct. 20, 2000, which is a con of U.S. patent application Ser. No. 09/431,512, filed Nov. 1, 1999 now U.S. Pat. No. 6,338,692.

TECHNICAL FIELD

The invention relates to an infinitely variable power transmission mechanism for use in transmitting torque from a torque input element to a torque output element with a wide torque ratio range.

BACKGROUND ART

Infinitely variable torque ratio characteristics for a power transmission can be achieved by using a friction belt and pulley arrangement in which a drive pulley and a driven pulley, connected by an endless belt, are adapted for torque transfer with an infinitely variable torque ratio range by adjusting the pitch diameter of the pulleys, the pitch diameter of the driving pulley increasing as the pitch diameter of the driven pulley decreases, and vice versa. Examples of belt drives of this kind may be seen by referring to U.S. Pat. Nos. 5,417,621 and 5,514,047.

It is known design practice also to provide infinitely variable torque ratio characteristics by using a hydraulic pump as a driving member and a hydraulic motor as a driven member. The pump and motor are located in a closed hydrostatic fluid pressure circuit. By varying the displacement of the pump, the effective speed ratio of the hydrostatic transmission can be changed through a wide torque ratio range.

Various types of infinitely variable friction drives also are well known. It is known design practice, for example, to use friction cone members wherein the relative positions of the friction cones are adjustable to provide an infinitely variable torque ratio characteristic. An example of a friction cone drive mechanism may be seen by referring to U.S. Pat. No. 5,681,235.

If an infinitely variable transmission is used with an internal combustion engine to deliver torque to driven members, such as vehicle traction wheels, the infinitely variable transmission characteristics can be matched with the engine speed/torque characteristics such that the engine may be operated with an engine throttle setting that will correspond to a speed consistent with minimum brake specific fuel consumption as variable torques are commanded by the operator. In this way, the continuously variable transmission improves the overall driveline efficiency.

DISCLOSURE OF INVENTION

The invention is a torque transfer method and an infinitely variable drive that comprises a rotary, generally conical driving member and a rotary, generally conical driven member. The driving and driven members are mounted for rotation, respectively, on a torque input shaft axis and a torque output shaft axis. Each carries needles on its surface. The needles mesh, thereby permitting torque transfer between the driving and driven members.

Although the invention may be used in a driveline with an internal combustion engine, it may be used also in other design applications: e.g., accessory drives, window regulators, machine tool drives, etc.

The infinitely variable drive of the invention transmits torque from a rotary torque input shaft to a rotary torque output shaft through the rotary driving and driven members. The shafts have axes that are spaced, one with respect to the other. Each member has a generally conical surface, each surface having a continuously curved profile that extends from one axial end thereof to the other. The driving and driven members rotate on their respective shaft axes. Each member has a cluster of torque transmitting needles on its surface. The needles of the driving member mesh with the needles of the driven member in an area of mesh as torque is transmitted between the members.

The surfaces of the rotary members of the invention are curved, rather than precisely of conical shape, and are defined as surfaces of revolution. The surfaces are in engagement, one with respect to the other, so that torque is transmitted between the rotary members. The angle of the axis of revolution of one member relative to the axis of revolution of the other member can be changed so that the position of the area of mesh of the needles on the surface of one member and the needles of the other member will change.

The rotary members will be referred to, for purposes of this description, as cone members. It should be understood, however, that their surfaces of revolution are not precisely conical. Further, the profile of each rotary member is curved, but the rotary members are not necessarily hemispherical. Incremental areas of the surfaces of revolution at various locations along the axis of rotation may have differing radii of curvature.

Unlike conventional conical drive mechanisms of the kind shown, for example, in the previously mentioned '235 patent, the area of mesh between the driving and driven members of the invention is not characterized by incremental portions of the area of contact of the driving and driven members that have differential speeds. This is due to the fact that the area of mesh is not characterized by frictional contact between the surfaces of the driving and driven members. The area of mesh is characterized instead by intermeshing needle elements densely formed on the surfaces of each of the rotating members. The needles themselves are in frictional engagement at the area of mesh as torque is distributed from one cone member to the other. Differential movement of incremental portions of the area of mesh for the respective rotating members is accommodated by flexure of the intermeshing needles. This flexure of the needles will permit continuous, efficient torque transfer between the members throughout the entire ratio range of the transmission. The flexure is coincident with frictional sliding motion of the needles of one cone member relative to the needles of the other cone member.

Known friction cone drives typically have frictional contact between the surfaces of friction cones. In actual practice, the cones do not engage at a single point. Rather, a so-called contact patch is established between the cones. Friction torque at the contact patch is developed by a tangential force component on the surface of each cone member. Because of the geometry of the conical surfaces, the contact patch has incremental areas where sliding motion will occur between the conical surfaces of the driving and driven members within the contact patch. This sliding motion requires the presence of a hydraulic lubricating oil film to avoid galling and deterioration of the friction surfaces of the conical members. The presence of an oil film, however, is imperfect protection against deterioration and wear of the friction surfaces, especially when the transmission is operated in a high torque range. The torque transfer between the driving and driven members of the present invention, unlike torque transfer in such conventional friction cone drives, takes place without the presence of a contact patch between the members. The flexure of the intermeshed needles of applicant's invention accommodate differential tangential velocities of the incremental portions of the contact areas of the members when the needles are in meshing engagement.

U.S. Pat. No. 4,028,949 discloses a linear transmission wherein motion of a driving strip can be transmitted to a driven strip with a ratio of unity. The motion transfer occurs through an endless belt carrying bristles that mesh with bristles on the linearly movable strips. It is not possible in an arrangement of this type to provide for infinitely variable ratio characteristics.

The transmission of the invention makes provision for adjusting the angularity of the rotating axis of each member in a continuous and smooth fashion without the requirement for high adjustment forces. The angularity of the conical members can be changed during torque transfer so that the overall torque ratio can be varied without interrupting the operation of the transmission.

The invention is capable of developing a wide range of ratios with elements that are assembled with an economy of space. In one embodiment of the invention, a ratio range of 10:1 to 0.4:1 has been successfully demonstrated. A torque capacity of 200 lb.-ft. or more easily can be accommodated using elements with a gross weight of 50 lbs. or less. It is emphasized, however, that these features are representative of only one embodiment of the invention. The torque capacity, for example, may be greater or less, depending on the design requirements.

The needles may be manufactured using a cold-heading method. The base of each needle may be enlarged to provide an anchor as the needles are punched through the surface of the conical surfaces.

An alternative manufacturing method involves forming the needles using a wire woven into a mesh matrix, the wires extending outward from the matrix. The wires are bent in a reentrant fashion to define the needles. The matrix is secured to the surfaces of the conical members.

Still another manufacturing method involves forming the needles using wire stock. Wire segments are welded to pockets in a metal ribbon. The metal ribbon is preformed with pockets on each side. The wire may be cut as part of the welding step to form the needles as the wire is fed into the ribbon pockets. The welded ribbon and needle assembly then is wound about the surfaces of the conical members and held in place in a subsequent welding step.

BRIEF DESCRIPTION OF DRAWINGS

FIG. 6 is a top view of the driving and driven members showing the engagement interface where torque transfer occurs;

FIG. 7 is a cross-sectional view of the interface as seen from the plane of section line 7—7 of FIG. 6;

BEST MODE FOR CARRYING OUT THE INVENTION

Figure 1:
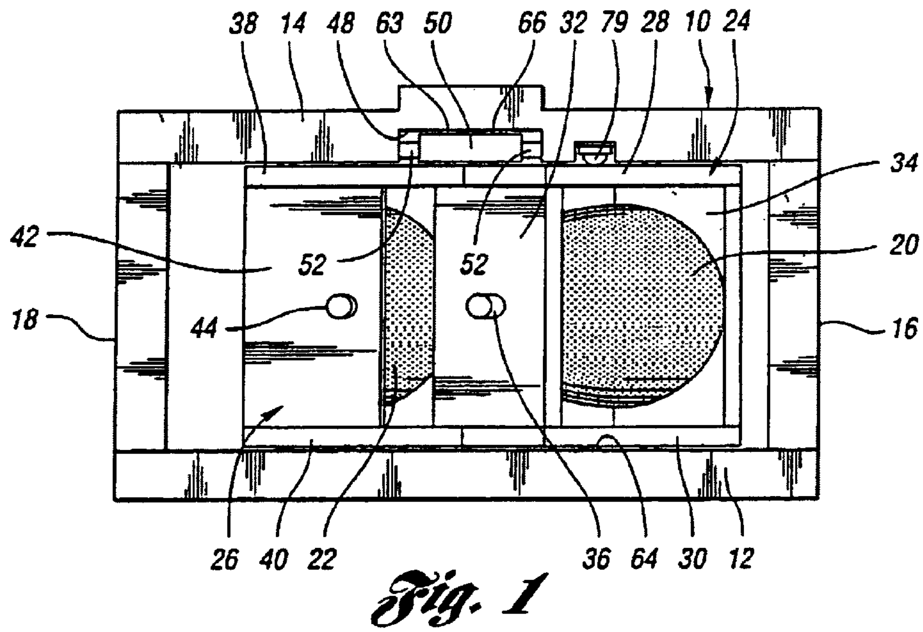
FIG. 1 is an end view of the transmission mechanism.
Figure 2:
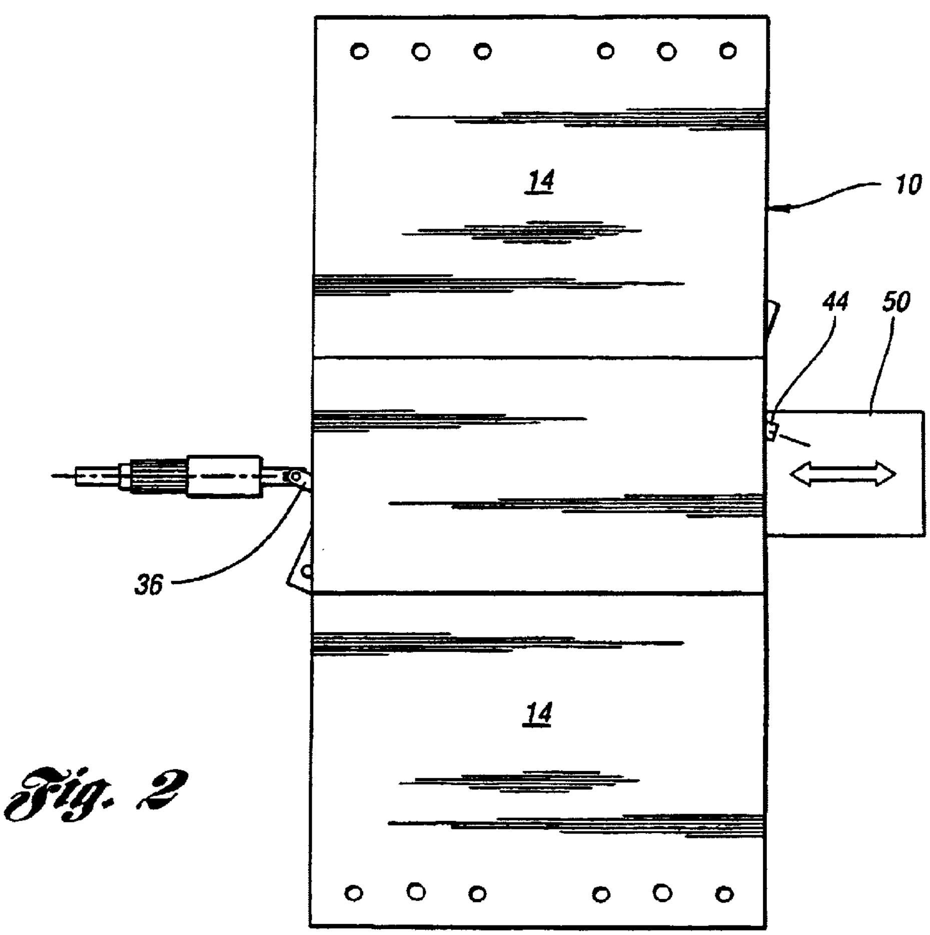
FIG. 2 is a plan view of the transmission mechanism.

The transmission assembly of the invention is generally designated by reference character 10 in FIGS. 1 and 2. It includes a main case or housing having a base 12 and a top plate 14. A pair of side plates 16 and 18 supports the top plate 14.

For purposes of this description, the housing is shown as an open housing to allow for a better view of the cone members. In actual practice, the housing preferably would be closed. This would facilitate the use of a lubricant, such as powdered graphite, powdered polymers or liquid hydrocarbon lubricant. The cone members, furthermore, would be protected by a closed housing when the invention is used in a harsh environment.

A pair of rotary, generally conical members is seen in the side view of FIG. 1 at 20 and 22. A torque output shaft, schematically shown in FIG. 1 at 44, is connected drivably to cone member 22. Each cone member is journalled on a separate carrier for rotation about its geometric axis. The carrier for cone member 20 is shown at 24, and the carrier for cone member 22 is shown at 26. The carrier 24 comprises an upper plate 28 and a lower plate 30. Side members 32 and 34, together with the members 28 and 30, define a carrier housing for the cone member 20.

Figure 4:
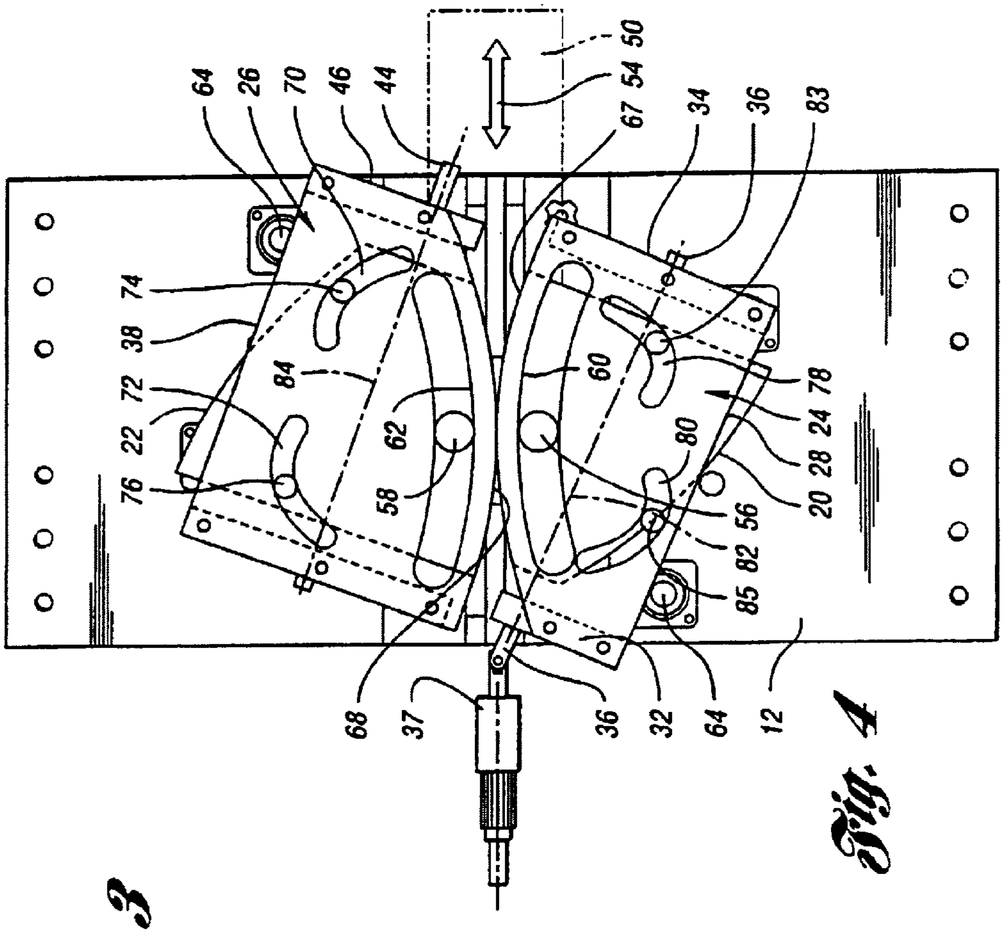
FIG. 4 is a top view of the transmission with the top plate removed, the conical members and the carriers for mounting the conical members being shown in phantom.

The cone member 20 is mounted for rotation about its geometric axis within the carrier 24. A torque input shaft 36 coincides with the geometric axis of the cone member 20 and is connected directly to it. Shaft 36, as seen in FIG. 4, may be connected to a drive shaft 37 by a universal joint; preferably, a constant velocity universal joint. Shaft 36 extends through openings formed in the side members 32 and 34.

Carrier 26 comprises an upper plate 38 and a lower plate 40. Side members, one of which is shown at 42, together with the upper plate 38 and the lower plate 40, define an enclosure for the cone member 22. The cone member 22 is mounted for rotation about its geometric axis in the carrier 26. A torque output shaft 44 is journalled in openings formed in the side member 42 and in a companion side member 46, as seen in FIG. 4. The torque output shaft 44 coincides with the axis of the cone member 22 and is connected directly to it.

The shafts 36 and 44 may be connected, respectively, to drive shaft 37 and to a driven shaft, not shown, by constant velocity universal joint that accommodate axial sliding motion. This will permit the cone member to adjust axially when cone members are of unequal size or are of non-hemispherical profile. Shaft 37 is shown as a spline shaft wherein the splines define a sliding spline portion of a constant velocity universal joint.

Figure 3:
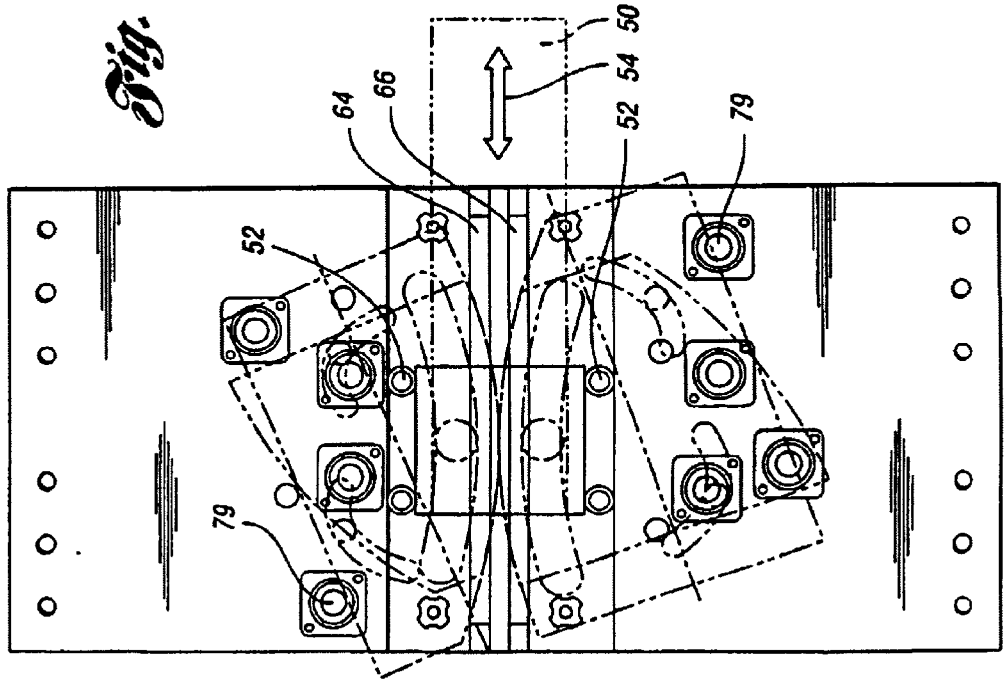
FIG. 3 is a view of the underside of a top plate seen in the plan view of FIG. 2.

The upper plate 14, as seen in FIG. 1, has a slot or channel of rectangular cross-section, as shown at 48. From the perspective of FIG. 1, the slot 48 is on the underside of the plate 14. An adjustable slide 50 is situated in the slot 48. On each side of the slide 50 are stabilizer rollers 52, as seen in FIGS. 1 and 3, which guide the slide 50 as it is moved within the slot 48 in the direction of the arrow 54 seen in FIGS. 3 and 4. A pair of bearing strips 63 and 66 is located in the rectangular groove 48.

The slide 50 has a pair of cylindrical guide members 56 and 58 situated in guide slots 60 and 62 in upper plates 28 and 38 for the carriers 24 and 26, respectively. The groove 60 conforms generally to the shape of the outer surface of the cone 20 and the groove 62 conforms generally to the shape of the outer surface of the cone 22.

The upper surface of the lower plate 12 is provided with ball bearings 64 for supporting the lower plates 30 and 40 of the carriers 24 and 26, respectively. The bearings 64 preferably are spherical bearing elements seated in a semispherical pocket formed in the lower plate 12. The spherical bearing elements, when adapted for universal movement in the semispherical pockets, permit the lower plates 30 and 40 of the carriers 24 and 26, respectively, to float on the lower plate 12.

When the slide 50 is moved in rectangular slot 48, the guide members 56 and 58 will cause the carriers 24 and 26 to change their angularity relative to the direction of motion of the slide 50. The upper plate 28 has a curved surface 67, which contacts a companion curved surface 68 formed on plate 38. Adjustment of the slide 50 in one direction or the other will cause the curved surfaces 67 and 68 to have rolling contact at their point of tangency.

The curved surfaces 67 and 68 generally conform in shape to the profile of the cone members 20 and 22, respectively. They may be changed, however, if the design requirements make it desirable to vary the depth of mesh of the needles at the area of mesh.

The upper plate 38 has grooves 70 and 72, which are engaged respectively by guide pins 74 and 76 secured to the underside of the upper plate 14. Similarly, the upper plate 28 of the carrier 24 has guide grooves 78 and 80, which register with guide pins 83 and 85, respectively. These guide pins 83 and 85 are secured to the undersurface of the top plate 14. The grooves 78 and 80, together with the pins 83 and 85, respectively, determine the angular position of the carrier 24 as the slide 50 is moved. Similarly, the guide grooves 70 and 72 in the upper plate 38, together with the guide pins 74 and 76, control the angularity of the carrier 26 as the slide 50 is adjusted in one direction or the other.

As best seen in FIGS. 1 and 3, the underside of the top plate 14 is provided with ball bearings 79. These bearings comprise a cylindrical bearing element that is received in a semispherical pocket. They essentially are of the same design as the bearings 64. The bearings 64 and the bearings 79 permit the carriers 24 and 26 to float within the confinement of the housing defined by upper and lower plates 14 and 12 and the side plates 16 and 18.

Although a mechanical slide 50 is shown for purposes of this description, it is emphasized that other types of actuators for adjusting the cone members may be used. For example, servo actuators or a screw-feed drive could be adapted to perform the function of slide 50. Further, any of several known bearing arrangements may be used to obtain the floating function of bearings 64 and 79 and the guiding function of bearing strips 63 and 66.

In the particular embodiment illustrated in the drawings, the cone member 20 is a driving member and the cone member 22 is a driven member. The axis of rotation of the member 20 is shown at 82 in FIG. 4, and the corresponding axis of rotation of the cone member 22 is shown at 84. The effective diameter of the cone surface at the area of tangency for the cone members is less in the case of cone member 20 than in the case of cone member 22. When the cone members are positioned as shown in FIG. 4, the torque output shaft 24 will be driven at a speed that is less than the speed of rotation of the torque input shaft 36. The overall speed ratio is changed as the carriers 24 are adjusted angularly. When the area of mesh or tangency for the cone members is near the small diameter end of the cone 20, the area of mesh or tangency for the cone member 22 is at a maximum radius. When the carrier 24 is adjusted in the opposite direction to its extreme position with the guide member 56 at the upper end of the guide slot 60, the areas of mesh or tangency of the cone members occur at a maximum radius for the cone 20 and at a minimum radius for the cone 22.

Figure 5A:
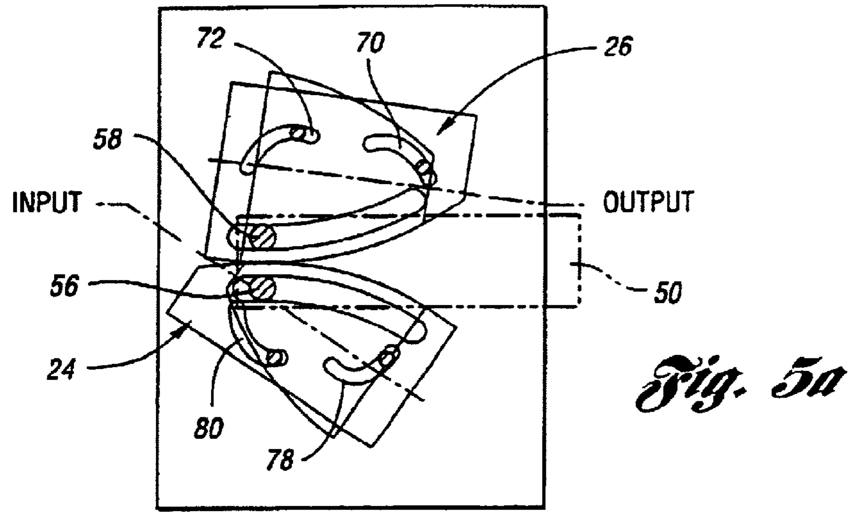
FIGS. 5*a*–5*c* are schematic representations of the torque-transmitting driving and driven members including a pin and groove interface between carriers for the driving and driven members and the transmission housing for controlling the angular position of the torque-transmitting members.
Figure 5B:
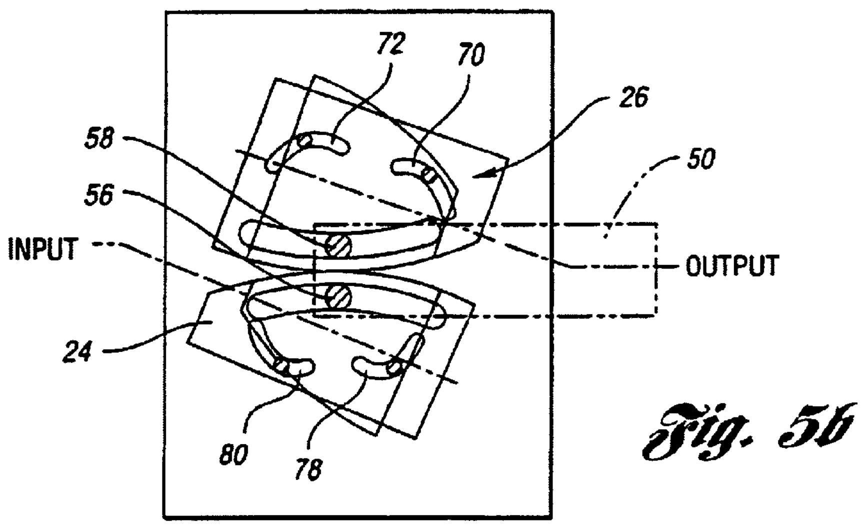
Figure 5C:
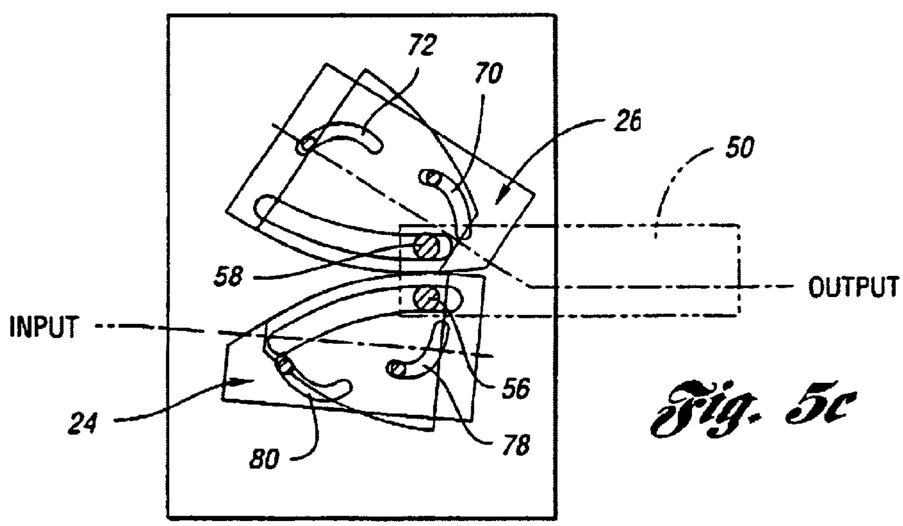

FIGS. 5*a*, 5*b* and 5*c* show the cone members in their various angular orientations. In the case of FIG. 5*a*, the carrier 24 and the carrier 26 are in their maximum underdrive positions. In the case of FIG. 5*c*, the carriers 24 and 26 are in their maximum overdrive orientation. In the case of FIG. 5*b*, the carriers 24 and 26 are positioned at an intermediate speed ratio position.

The density of the needles on the cone members can be changed depending upon the design requirements of a particular application. Further, the size of the needles (i.e., the length and diameter) also can be changed, as required. In one embodiment of the invention, the density is about 14 thousand needles per square inch.

FIGS. 6 and 7 show the details of the cone members. FIG. 6 shows the cone members with an angular orientation corresponding to a mid-range speed ratio. The cone members are formed of a suitable rigid structural material. The cone member 20 is fixed, as explained previously, to the torque input shaft 36 and cone member 22 is fixed to the torque output shaft 44. The curved surface of the cone member 20 has torque transmitting needles 86 and the curved surface of cone member 22 has corresponding needles 88. The needles 86 and 88 are secured in cantilever fashion to the surfaces of the cone members and generally extend perpendicularly from their respective curved surfaces. The needles 86 intermesh with the needles 88 so that as torque is applied to the cone member 20, the cone member 22 is driven in synchronism. As the cone members rotate, one with respect to the other, the needles 86 and 88 move into and out of registry so that there is a continuous driving connection between the cone members as torque is transmitted across the interface. The interface is established by the intermeshed needles. Flexure of the needles at the interface accommodates the varying angular velocities of incremental segments on one cone curved surface with respect to the corresponding incremental surface on the companion cone curved surface. There is no physical contact between the curved surfaces as in the case of a friction cone drive of conventional construction.

Figure 8:
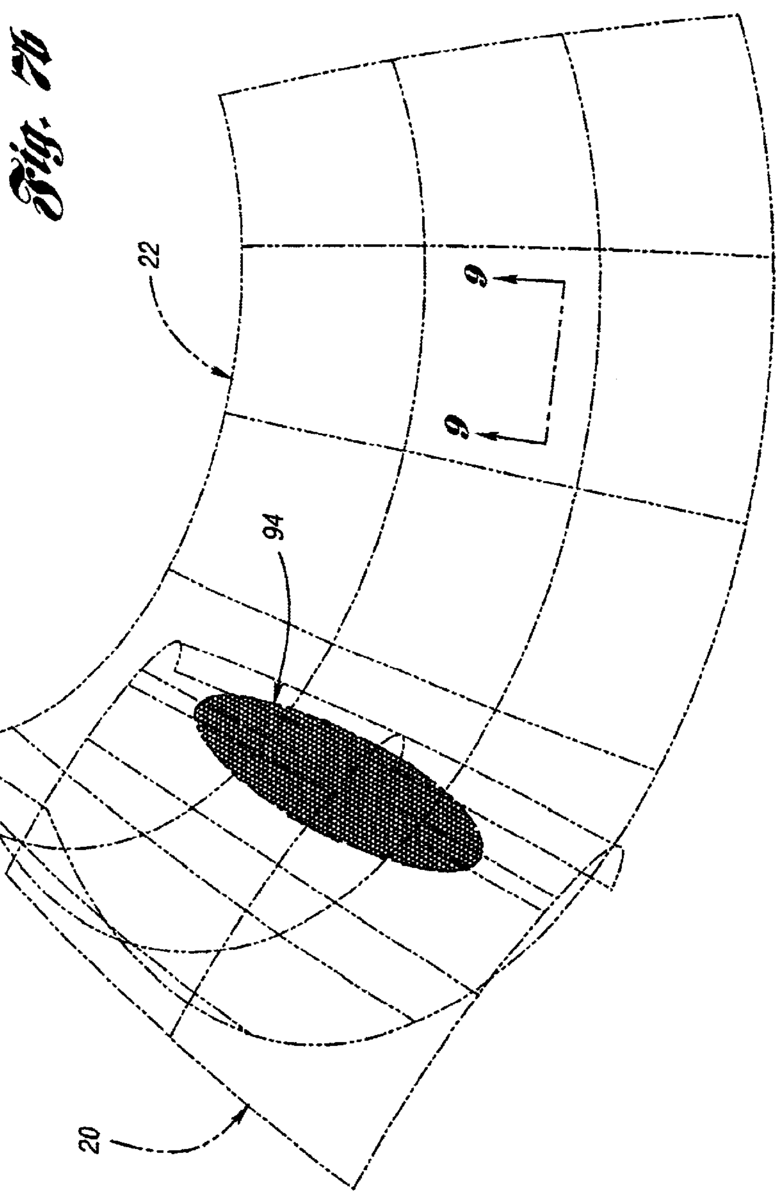
FIG. 8 is a perspective view of the surfaces of the driving and driven members shown in FIG. 6 and the area of mesh of the needles carried on the surfaces.

FIG. 8 is a perspective view of the generally conical surfaces of the driving and driven members 20 and 22. The area of mesh for the needles on the members 20 and 22 is indicated at 94. As indicated, the area of mesh is generally elliptical. The location of the area of mesh on the members 20 and 22 will shift between the ends of the members. The direction of shift depends upon whether the torque ratio is increasing or decreasing.

The members 20 and 22 are shown in phantom in FIG. 8 to clarify their relative dispositions as the area of mesh 94 is generated.

FIG. 6 shows a plan view of the needles of the cone members. The needles are arranged in a dense pattern over the surfaces of the cone members. The spacing between adjacent needles may be about 0.0085 to 0.0090 inches in the direction of the axis of each cone members. The spacing between adjacent needles measured in a direction transverse to the axis of each cone members also is approximately 0.0085 to 0.0090 inches. The needles themselves are generally cylindrical, as indicated in the detailed view of FIG. 7*a*. The diameter of the needles may be approximately 0.004 inches so that only a slight clearance is provided between the needles of one cone member relative to the needles of the other cone member. A typical length for the needles may be 0.060 inches.

Figure 7A:
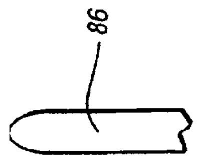
FIG. 7*a* is an enlarged detailed side view of one of the torque-transmitting needles carried by the surfaces of the drums seen in FIG. 6.
Figure 7C:
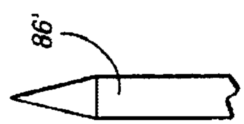
FIGS. 7*c* and 7*d* show alternate needle shapes that can be used instead of the needle shape shown in FIG. 7*a;*
Figure 7D:
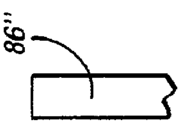
Figure 7B:
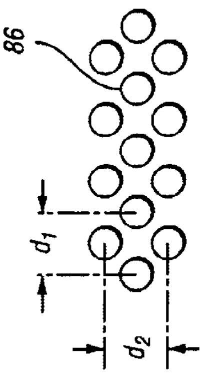
FIG. 7*b* is a view showing the ends of the needles carried by the drums of FIG. 6 as seen from the plane of section line 7*b*—7*b* of FIG. 7.

FIG. 7*b* is an enlarged plan view of a small area of the needles for the cone members. The dimension "$d_1$" represents the spacing of the needles in the direction of the axis of rotation of the cone members, and the dimension "$d_2$" represents the spacing of the needles in a direction transverse to the axis of rotation. These dimensions may be 0.0085 to 0.0090, as mentioned above.

The ends of the needles may be bullet-shaped or rounded as seen in FIG. 7*a* to facilitate movement of the needles of one cone member into registry with the needles of the other cone member as the cone members rotate. Other designs for the ends of the needles also are possible. For example, the needles may have a sharp tip, as shown at 86' in FIG. 7*c*; or a blunt tip, as shown at 86" in FIG. 7*d*. It is possible as well to use needles that are not of round cross section. Further, the cross sectional area of the needles may be variable from the base to the tip.

The geometry of the surfaces of the cone members is a function of the overall ratio range that is required for a particular application for the transmission. In the embodiment shown in FIG. 6, the cone member 20 is of lesser diameter than the cone member 22.

When the carriers are angularly adjusted upon movement of the slide 50, either or both may shift in the direction of motion of the slide. This shift is due to the fact that the cone members usually are of unequal diameter for any given length. This shift is accommodated by the guide grooves 70, 72, 78 and 80 as the carriers 24 and 26 float on the bearings 64 and 78. The surfaces 67 and 68 on the carriers will accommodate sliding engagement, one with respect to the other, as well as rolling engagement.

The needles may be formed of high carbon alloy steel. Other materials that may be used for this purpose are structural polymers or spring steel. It is preferable to use powdered graphite as a lubricant for the cone members to reduce friction, although lubricating oil or a lubrication oil mist can be used, particularly if cooling is needed. Polymer powder or a liquid polymer lube also may be used. But an oil film at the interface for the cone members is not required for torque transfer as in the case of prior art friction cone drives. All of the torque transfer is accommodated by the needles as they flex without over-stressing of the needles. The needles themselves act as cantilever beams that are subject to a degree of flexure well below the elastic limit.

The term "needles" is used herein to describe the area of mesh. For purposes of this description, the term "needles" should be construed to include fingers, protrusions, wires, pins, etc. For low torque applications, non-metallic needles such as molded nylon needles or various nonferrous, polymer-based materials could be used.

Although the needles for the disclosed embodiment of the invention extend radially from the axes of rotation of the cone members, they may be offset or biased in a non-perpendicular fashion if that configuration would be required for a particular design.

FIG. 6 shows an annular area 90 on the small end of cone member 20 and a corresponding annular area 92 on the large end of cone member 22. These areas lack needles (i.e., they are bald). When the cone members are adjusted to their maximum underdrive positions with the areas 90 and 92 in substantial registry, the infinitely variable drive will be in a neutral mode with no torque transfer between the cone members. The surfaces 67 and 68 on the carriers can be designed to provide a slight clearance between the surfaces 90 and 92 when they are in registry. This neutral mode feature makes it possible to provide interruption in torque transfer through the torque flow path without the need for a separate neutral clutch.

The density of the needles for each cone member can be nonuniform if that is required for a particular design application. Further, the density of the needles of one cone need not be the same as the density of the needles of the companion cone member. Again, this feature would be determined by design requirements.

Figure 9:
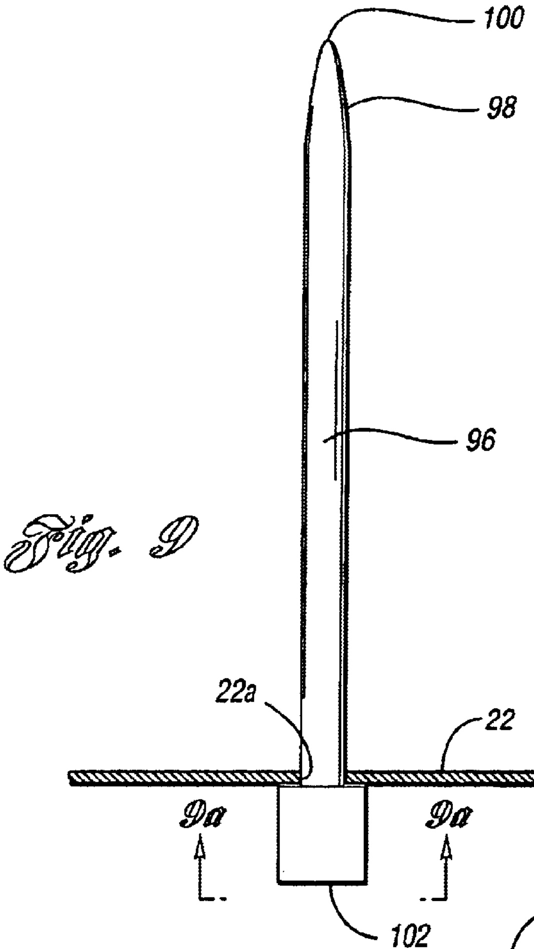
FIG. 9 is a partial cross-sectional view of one construction of a needle that may be pushed through the surfaces of the conical driving and driven members as seen from the plane of section line 9—9 of FIG. 8.
Figure 9A:
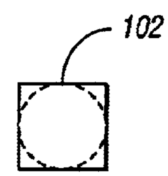
FIG. 9*a* is an end view of the needle of FIG. 9 as seen from the plane of section line 9*a*—9*a* of FIG. 9.

FIG. 9 shows a needle in the form of a pin 96, which may have a length of approximately 0.160. A bullet taper portion 98 at one end of the pin 96 is rounded to a point 100. The base of the pin shown at 102 is enlarged relative to the thickness of the pin and is formed with a generally square shape, as seen in FIG. 9*a*. The pins are received in openings 22*a* in the surfaces of the cone members.

The pin 96 can be formed, for example, by a cold heading process using stainless steel material. In some applications, it would be possible to use nylon rather than stainless steel. The thickness of the pin may be about 0.006 in.

The individual pins 96 can be pushed through a matrix at the drum surfaces. The drum surface can be a separate matrix attached to the drum, although the drum surface may be used as the retaining matrix.

Figure 10:
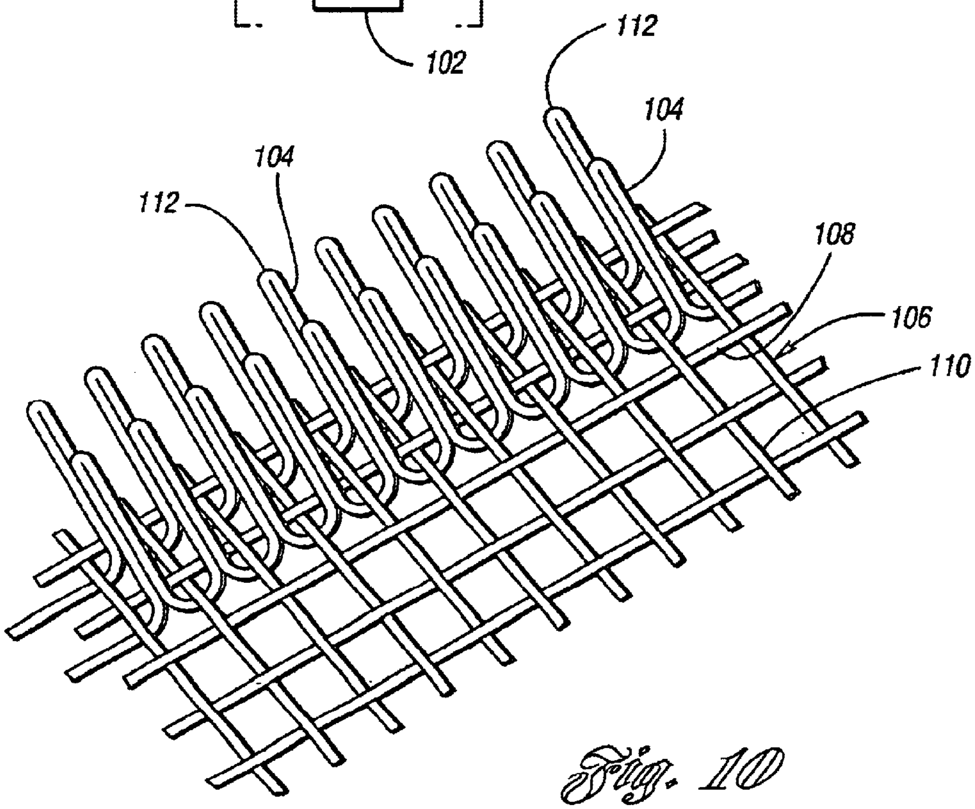
FIG. 10 is a partial assembly view of a construction that comprises a mesh wire matrix with needles in the form of a continuous wire woven into the matrix.

An alternate needle design is shown in FIG. 10. The needles of FIG. 10 comprise loops 104, which may be made of the same material used in forming pins 96. The loops extend through openings in a woven matrix 106. The matrix 106 has wires or fibers 108 and 110 extending perpendicularly one with respect to the other. The loops 104 engage the fibers or wires 110 and extend radially outward from the plane of the woven matrix. The wires 104 extend in a reentrant fashion to define rounded points 112. The wires 108 and 110 may be formed using the same material used in making the needles.

Figure 11:
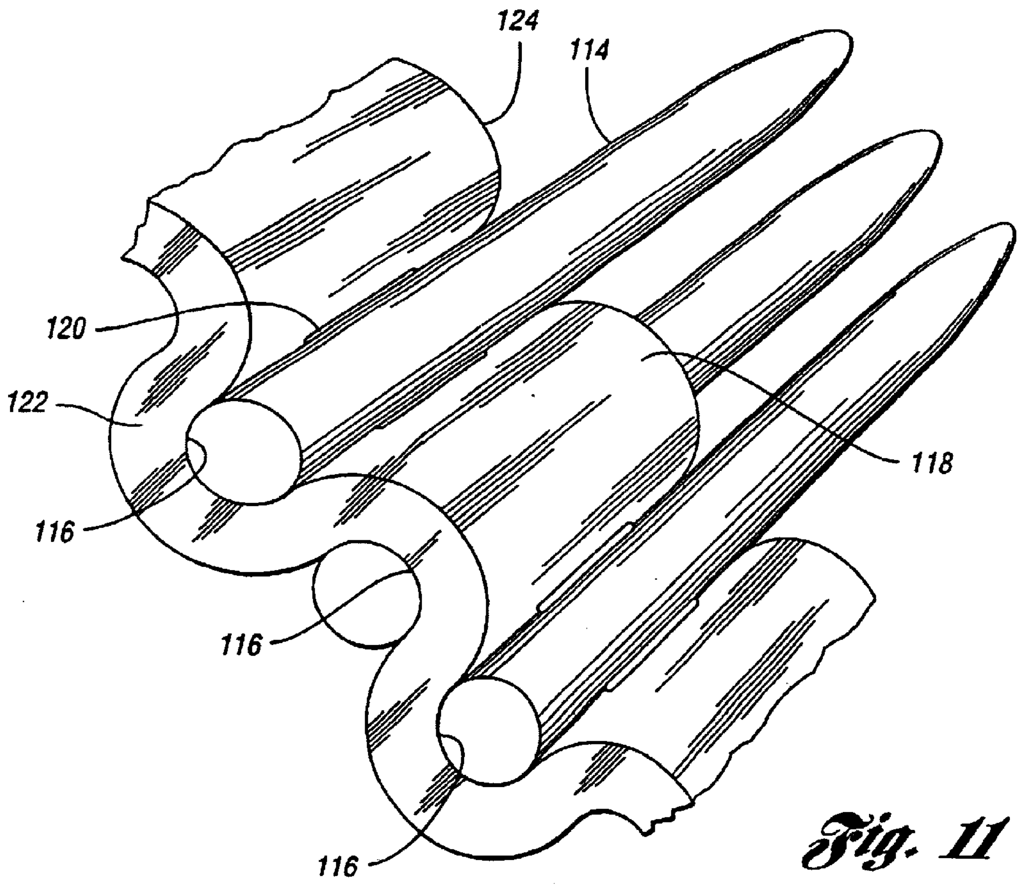
FIG. 11 is another partial assembly view of a construction that comprises a ribbon with undulations that define pockets within which wire segments are welded, the wire segments forming needles.
Figure 11A:
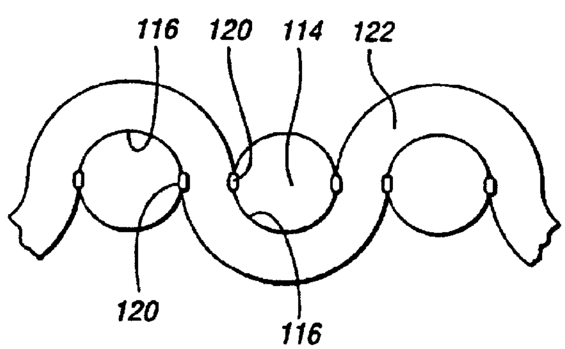
FIG. 11*a* is an end view of the partial assembly of FIG. 11.

A welding technique can be used to form the cone surface and pin assembly shown in FIGS. 11 and 11*a*. In the embodiment of FIGS. 11 and 11*a*, steel wires 114 are fed into the pockets 116 of ribbon stock 118. The wires 114, as well as the ribbon stock 118, can be stainless steel (SAE 302-SS). A micro-welding technique can be used to attach the wires 114 to the pockets 116 using a laser tack weld step, as shown at 120. The tack welds 120 may be located approximately one-third of the distance between one edge 122 of the ribbon 118 and the other edge 124. The ribbon is preformed using a crimping tool which forms pockets 116 before the wires 114 are inserted. Although a tack weld is shown on each side of each wire 114, a single weld may be used on only one side of the wire if that is appropriate for a particular design.

In one embodiment of the invention, the width of the ribbon may be 0.400 in. to 0.800 in. The thickness of the ribbon may be approximately 0.003 in. to 0.010 in. The wires 114 can be fed into the pockets of the ribbon from a spool. When they are in place, the laser will cut the wires 114 to the desired length, which may be about 0.140 in. The bullet shape of the pin that is formed from the wires 114 may be similar to that shown in FIG. 9. The bullet curvature can be formed by the laser cutoff step.

After the welding step is completed, the pin and ribbon assembly is wound on the cone surfaces. The cone surfaces may be steel, and the edge 122 can be welded with a continuous weld, such as a laser weld, to the surfaces of the cones so that the pins formed from the wires 114 extend generally perpendicularly with respect to the cone surface.

The weld at the junctures between the ribbon and the pins is seen at 120 in FIG. 11 on one side of the ribbon. A corresponding weld is formed in the joint in the pockets on the opposite side of the ribbon, as indicated in FIG. 11*a*.

The laser welding of the edges of the ribbon windings takes place as the ribbons are wrapped around the steel cone surface.

A bond at the junctures of the pins and the ribbons may be made by welding techniques other than laser welding. Brazing and soldering techniques also may be used to form the bond, depending on the design requirements. Such alternative bonding techniques may be used also to secure the edge of the ribbons to the cone surfaces.

Each of the embodiments shown in FIGS. 9, 9*a* and 10, on the one hand, and FIGS. 11 and 11*a* on the other hand, may involve securing the pins directly to the drum surface. The woven matrix 108 shown in FIG. 10 may be a separate matrix, or it may define the drum surface itself. Similarly, the edges 122 of the ribbons 118 of the embodiment of FIGS. 11 and 11*a* may be secured directly to the drum surface using a welding technique, or they may be secured to a substrate. The substrate, in turn, may be wrapped around the drum surface.

In the case of the embodiment of FIG. 10, the wire loops, which define the needles, can be formed from the same material of which the woven matrix 106 is formed. That material may be stainless steel, or nylon, or other structural material depending on the design requirements.

What is claimed is:

1. An infinitely variable power transmission mechanism for transmitting torque from a rotary torque input shaft to a rotary torque output shaft comprising first and second rotary members forming a torque flow path from the torque input shaft to the torque output shaft;

- the torque input shaft and the torque output shaft having axes that are spaced apart, one with respect to the other;
- at least one of the first and second members having a generally conical surface, said surface having a continuously curved profile that extends from one axial end thereof to the opposite axial end;
- the rotary members having surfaces that are engageable at an area of engagement;
- the first member and the second member each including a cluster of torque transmitting needles on its surface, the needles extending in a radially outward direction relative to the shaft axes;
- the needles of the first member being in meshing contact with the needles of the second member in the area of engagement whereby torque is transferred from one rotary member to the other, the needles comprising a shaft portion, a curved portion defining a needle tip and a base portion of greater cross-section than the shaft portion; and
- the shaft portion of the needles extending radially outward through the conical surfaces of the rotary members whereby the needles are anchored to the conical surfaces by the base portions.

* * * * *